(12) United States Patent
Lin (10) Patent No.: US 7,752,721 B2
(45) Date of Patent: Jul. 13, 2010

(54) SWIVEL HOOK ASSEMBLY

(75) Inventor: Ralph Lin, Taipei (TW)

(73) Assignee: Han Lien International Corp., Taipei (TW)

( * ) Notice: Subject to any disclaimer, the term of this patent is extended or adjusted under 35 U.S.C. 154(b) by 0 days.

(21) Appl. No.: 12/413,657

(22) Filed: Mar. 30, 2009

(65) Prior Publication Data

US 2010/0139052 A1    Jun. 10, 2010

(30) Foreign Application Priority Data

Dec. 8, 2008 (TW) .............................. 97221981 U (51) Int. Cl.
*F16B 45/04* (2006.01)
(52) U.S. Cl. .................................................. 24/600.6
(58) Field of Classification Search ............... 24/600.6, 24/265 H; 294/82.23
See application file for complete search history.

(56) References Cited

U.S. PATENT DOCUMENTS

| 311,941 A * | 2/1885 | Armstrong | 24/600.6 |
| 3,861,007 A * | 1/1975 | Silverman | 24/600.6 |
| 6,401,312 B1 * | 6/2002 | Wang | 24/600.6 |

\* cited by examiner

*Primary Examiner*—James R Brittain
(74) *Attorney, Agent, or Firm*—Browdy and Neimark, PLLC (57) ABSTRACT

A swivel hook assembly includes a hook holder, a hook, which has a hook shank rotatably connected to the hook holder and a hook head for hooking, a barrel sleeved onto the hook holder and movable relative to the hook holder between a first position to close the hook head of the hook and a second position to open the hook head of the hook for hooking, and a spring member connected between the hook holder and the barrel to support the barrel in the first position.

12 Claims, 12 Drawing Sheets

SWIVEL HOOK ASSEMBLY

BACKGROUND OF THE INVENTION

1. Field of the Invention

The present invention relates generally to swivel hooks and more particularly, to a swivel hook assembly, which enables the hook head to be closed/opened by means of a sliding movement of a barrel.

2. Description of the Related Art

In our daily living or in a work place, a swivel hook may be used to temporarily connect an object, such as rope. After the task is done, the object is released from the swivel hook. To fit different hooking requirements and to bear different external pressure, different swivel hooks may be used. Easy closing and opening operations and high hooking stability are important factors upon designing a swivel hook.

Many simple swivel hook designs are commercially available. Taiwan patent publication No. 501677 discloses a simple design of swivel hook. This design of swivel hook has the latch stopped against the end portion of the hook head, thereby closing the hook head. However, this design of swivel hook has numerous drawbacks as follows. The latch has low structure strength and tends to be broken by an external force. Further, when the hook head or the latch is biased by an external force, the hook head will be opened, causing possible disconnection of the object from the hook head. Furthermore, because the latch is stopped against the end portion of the hook head end-to-end, it tends to be forced away from the end portion of the hook head accidentally, causing the object to escape out of the hook head.

Therefore, it is desirable to provide a swivel hook assembly that eliminates the aforesaid problem.

SUMMARY OF THE INVENTION

The present invention has been accomplished under the circumstances in view. It is one objective of the present invention to provide a swivel hook assembly, which has high hooking strength against stretching of the hooked object, avoiding disconnection of the hook head from the object on which it hooked.

It is another objective of the present invention to provide a swivel hook assembly, which assures high hooking stability.

It is still another objective of the present invention to provide a swivel hook assembly, which avoids accidental triggering to disconnect the hook head from the object on which it hooks.

To achieve these objectives of the present invention, a swivel hook assembly comprises a hook holder having an axle hole, a barrel sleeved onto the hook holder and movable relative to the hook holder between a first position and a second position, a spring member stopped between the hook holder and the barrel to hold the barrel in the first position, a hook, which comprises a hook shank axially passing through the barrel and inserted in the hook holder, and a hook head located on one end of the hook shank for hooking on an external object. The barrel comprises two locating plates axially extending from one end thereof and disposed at two opposite sides relative to the hook. The hook head has an end portion, which is kept between the two locating plates of the barrel so that the hook head is closed when the barrel is kept in the first position. The end portion of the hook head is spaced from the two locating plates of the barrel when the barrel is kept in the second position, and therefore the hook head is opened for hooking. When the hook head is in the closed condition, the end portion of the hook head is kept between the two locating plates against external force, therefore the swivel hook assembly has high structural strength against stretching of the hooked object, avoiding disconnection of the hook head from the object on which it hooked. When the hook head is in the closed condition, the end portion of the hook head is kept between the two locating plates but not stopped against the two locating plates in an end-to-end manner. Therefore, biasing between the locating plates and the hook head does not cause the hook head to be opened, assuring connection stability. The arrangement in which the hook head is kept between the two locating plates avoids accidental triggering of the swivel hook assembly to disconnect the hook head from the object.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
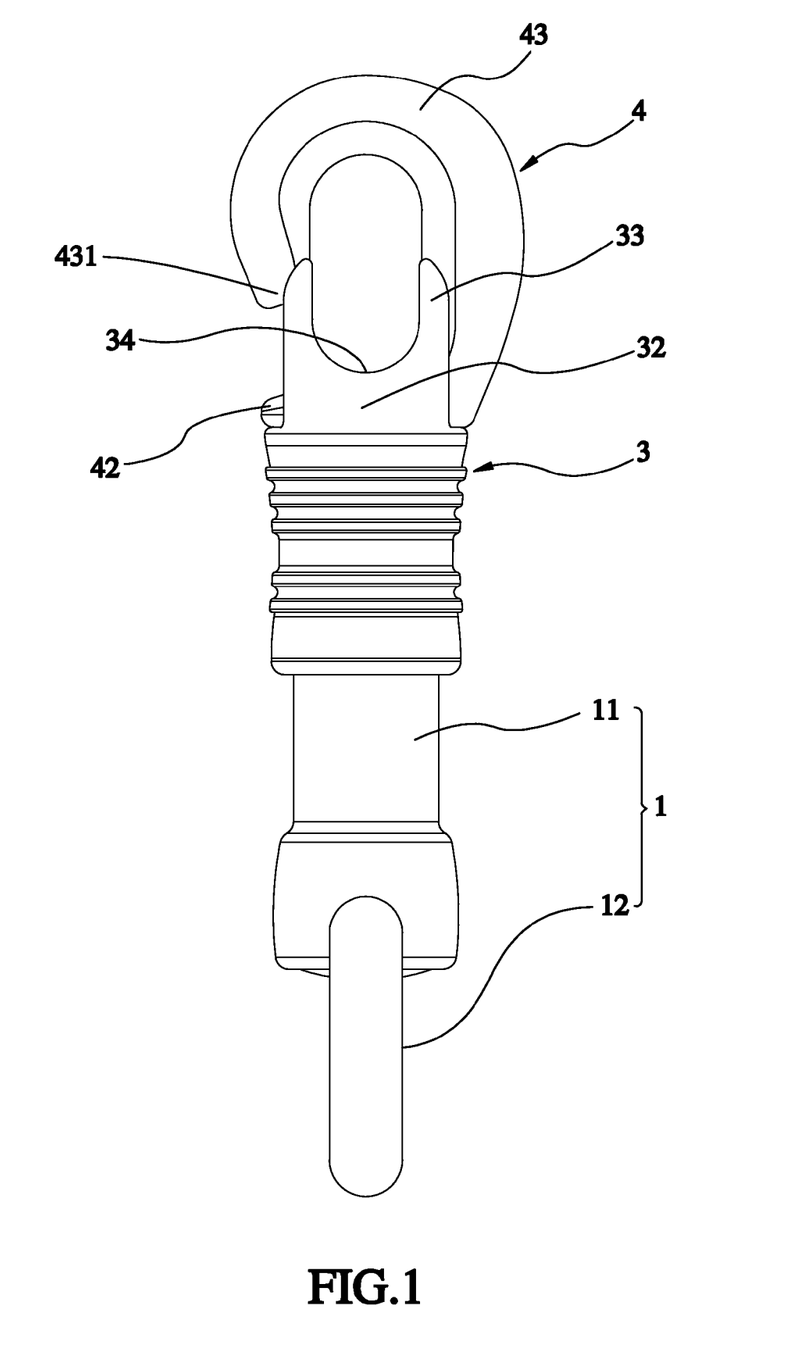
FIG. 1 is a front view of a swivel hook assembly in accordance with a first embodiment of the present invention.
Figure 2:
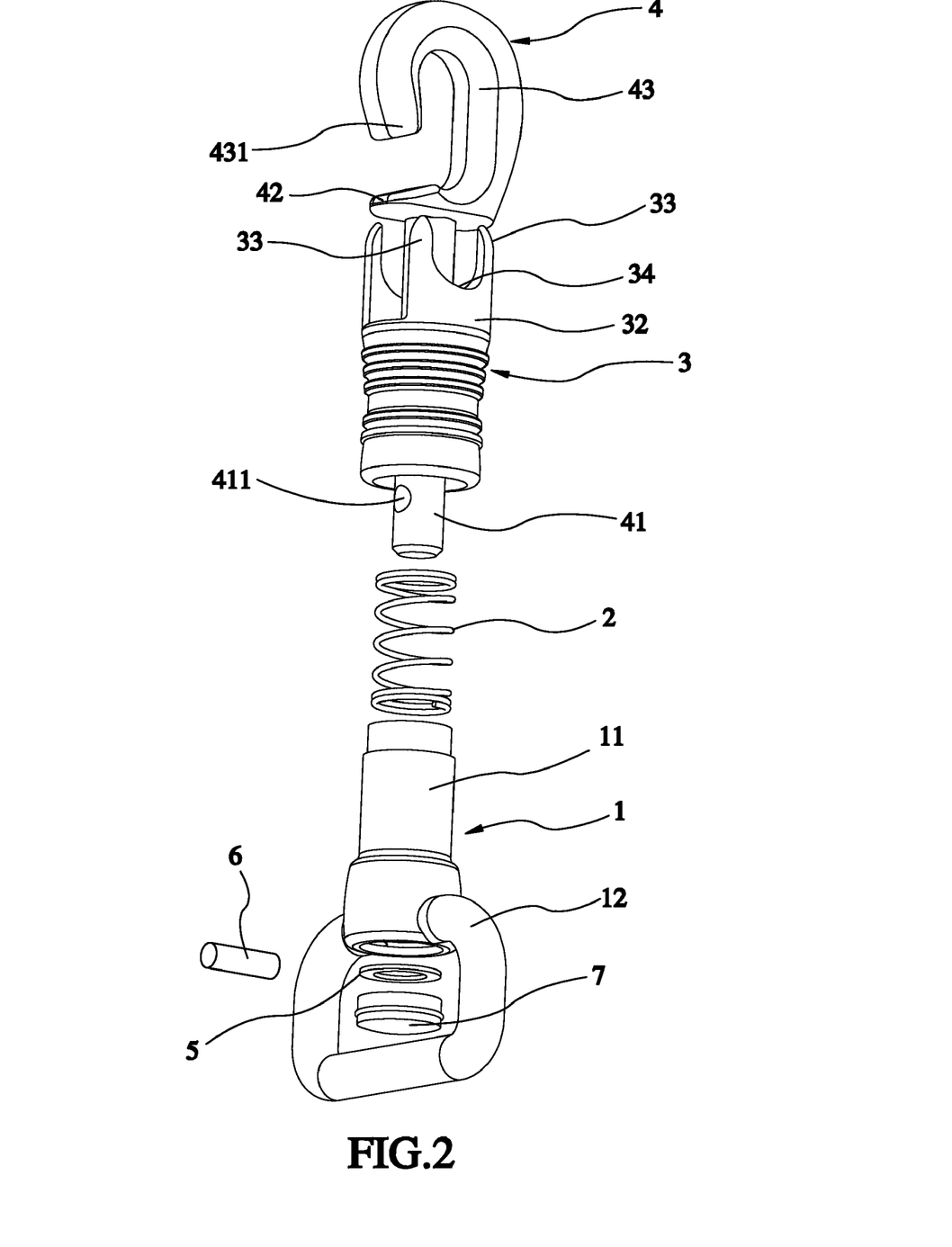
FIG. 2 is an exploded view of the swivel hook assembly in accordance with the first embodiment of the present invention.
Figure 3:
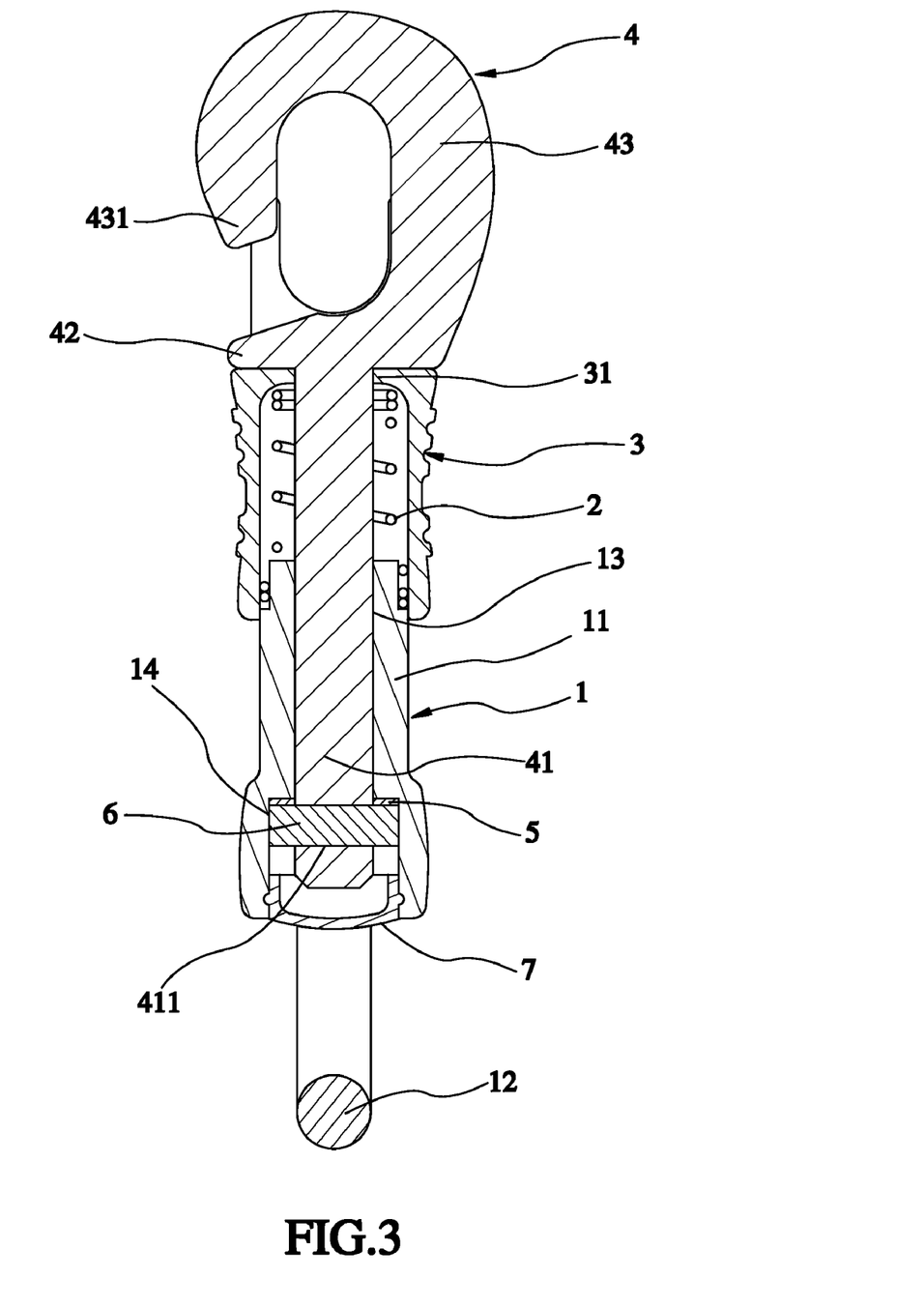
FIG. 3 is a sectional view of the swivel hook assembly in accordance with the first embodiment of the present invention.
Figure 4:
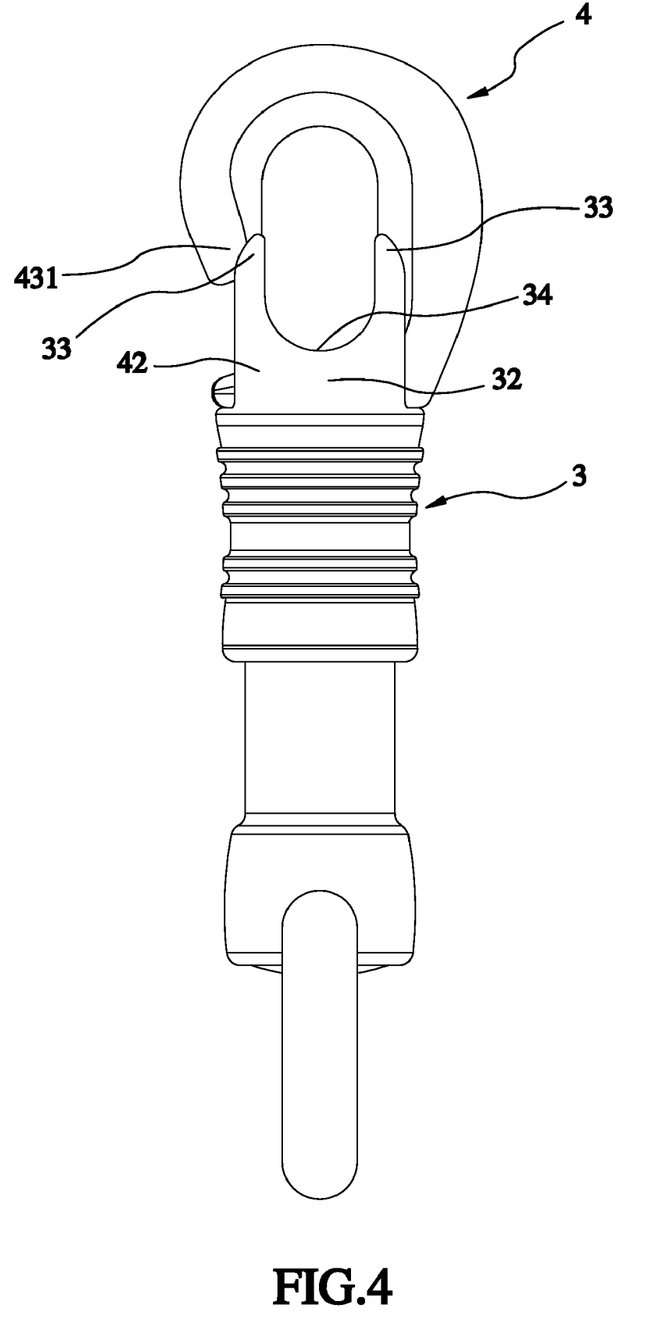
FIG. 4 is a front view of the first embodiment of the present invention, showing the hook head closed, the end portion of the hook head kept between the teeth of the two locating plates.
Figure 5:
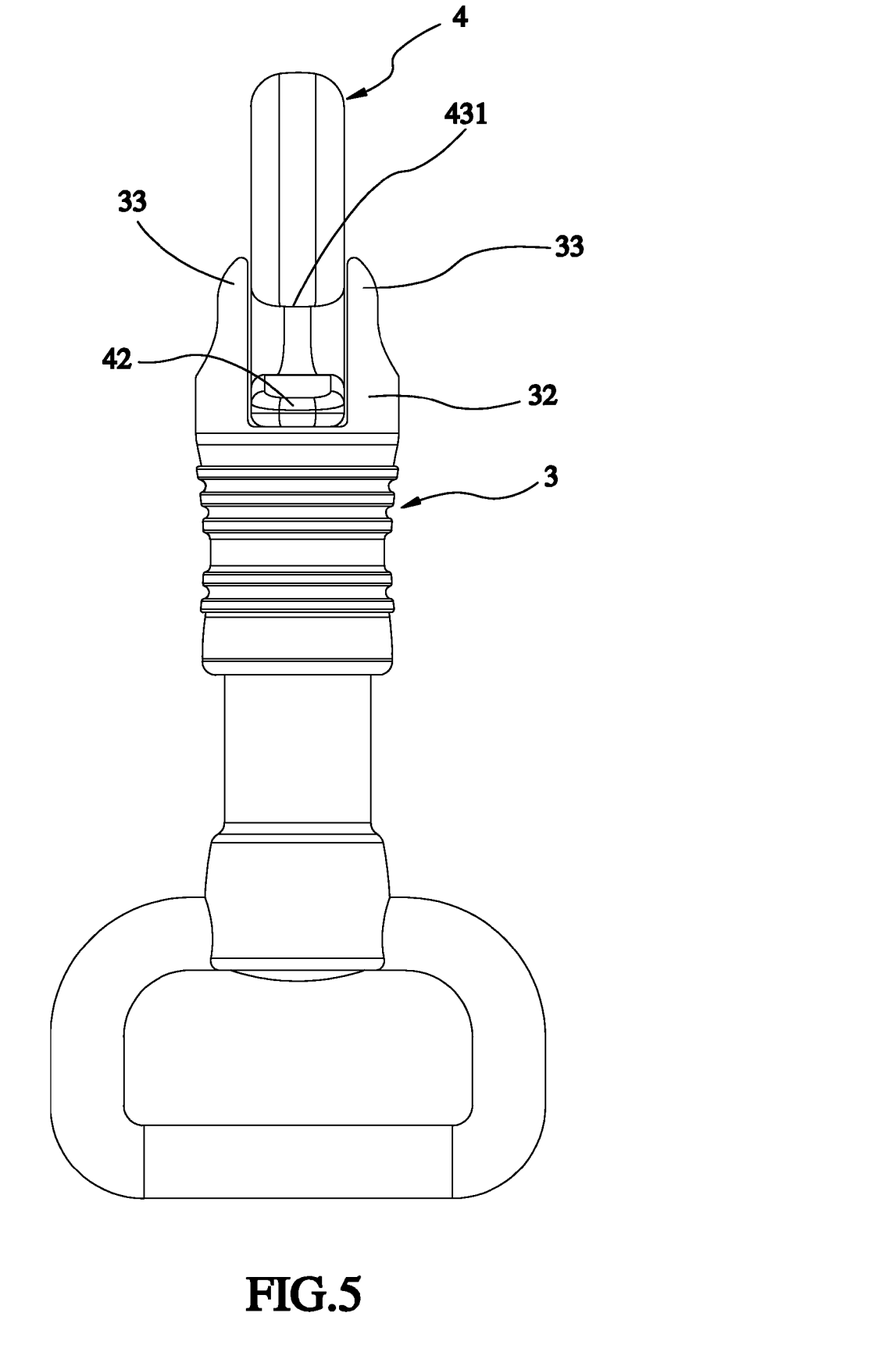
FIG. 5 is a side view of FIG. 4.
Figure 6:
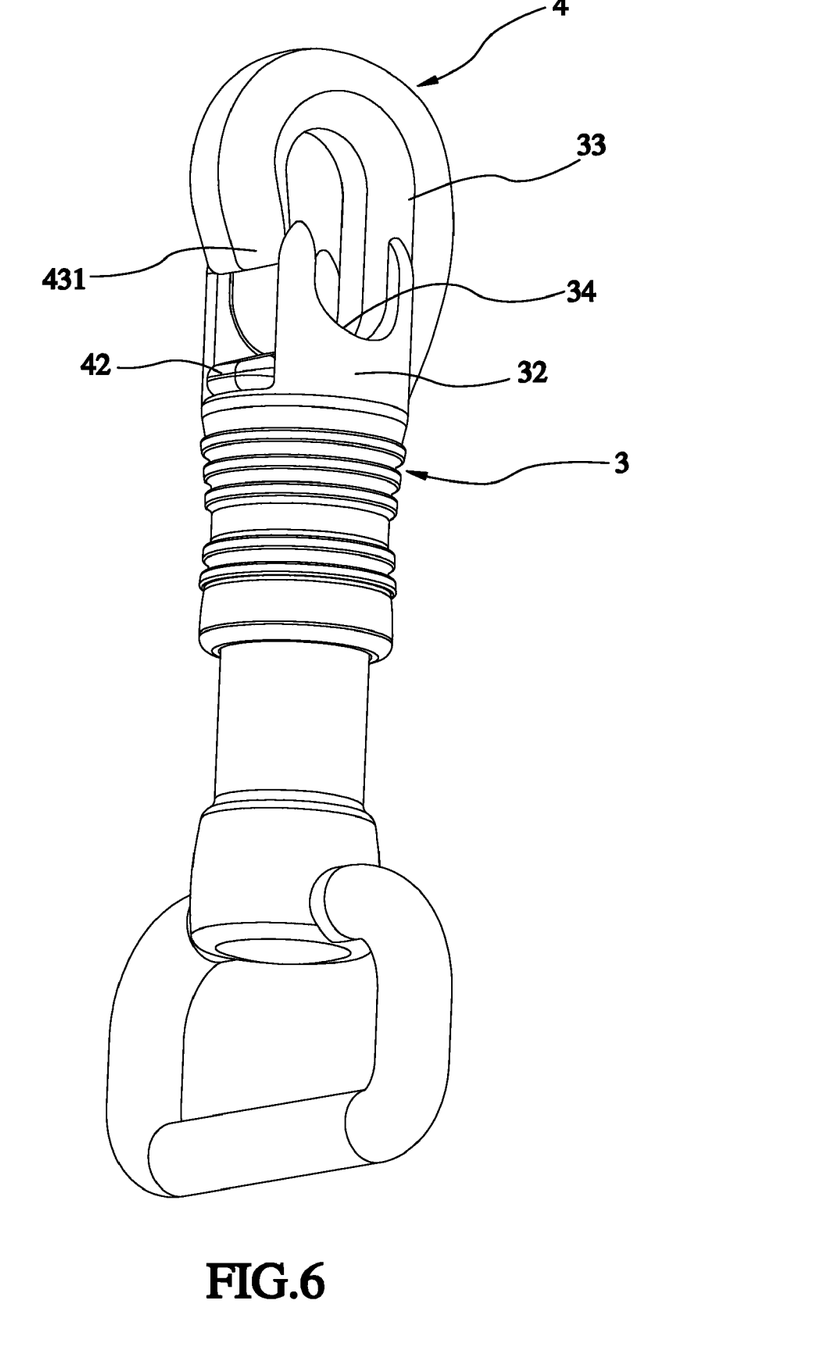
FIG. 6 is a perspective view of FIG. 4.
Figure 7:
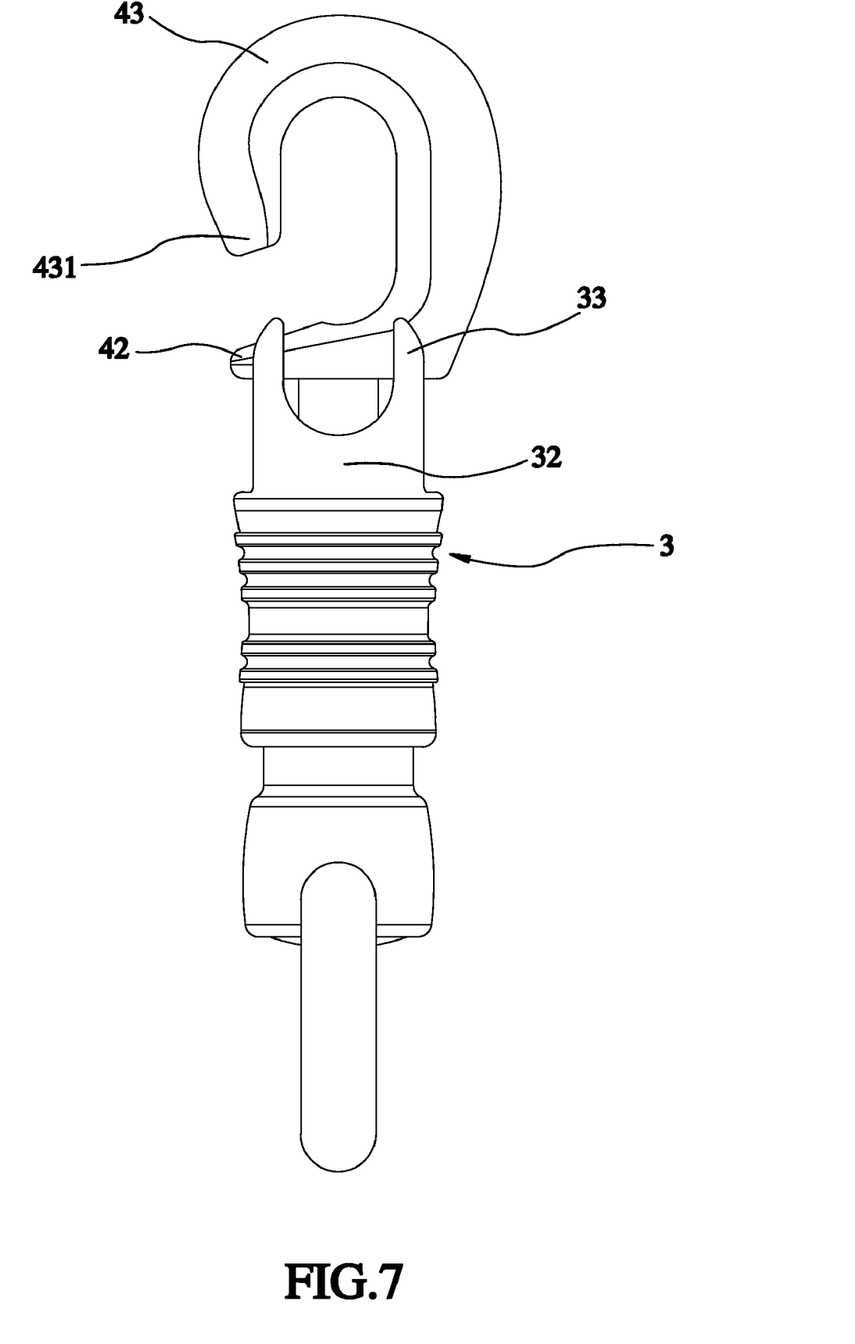
FIG. 7 is a front view of the first embodiment of the present invention, showing the hook head opened.
Figure 8:
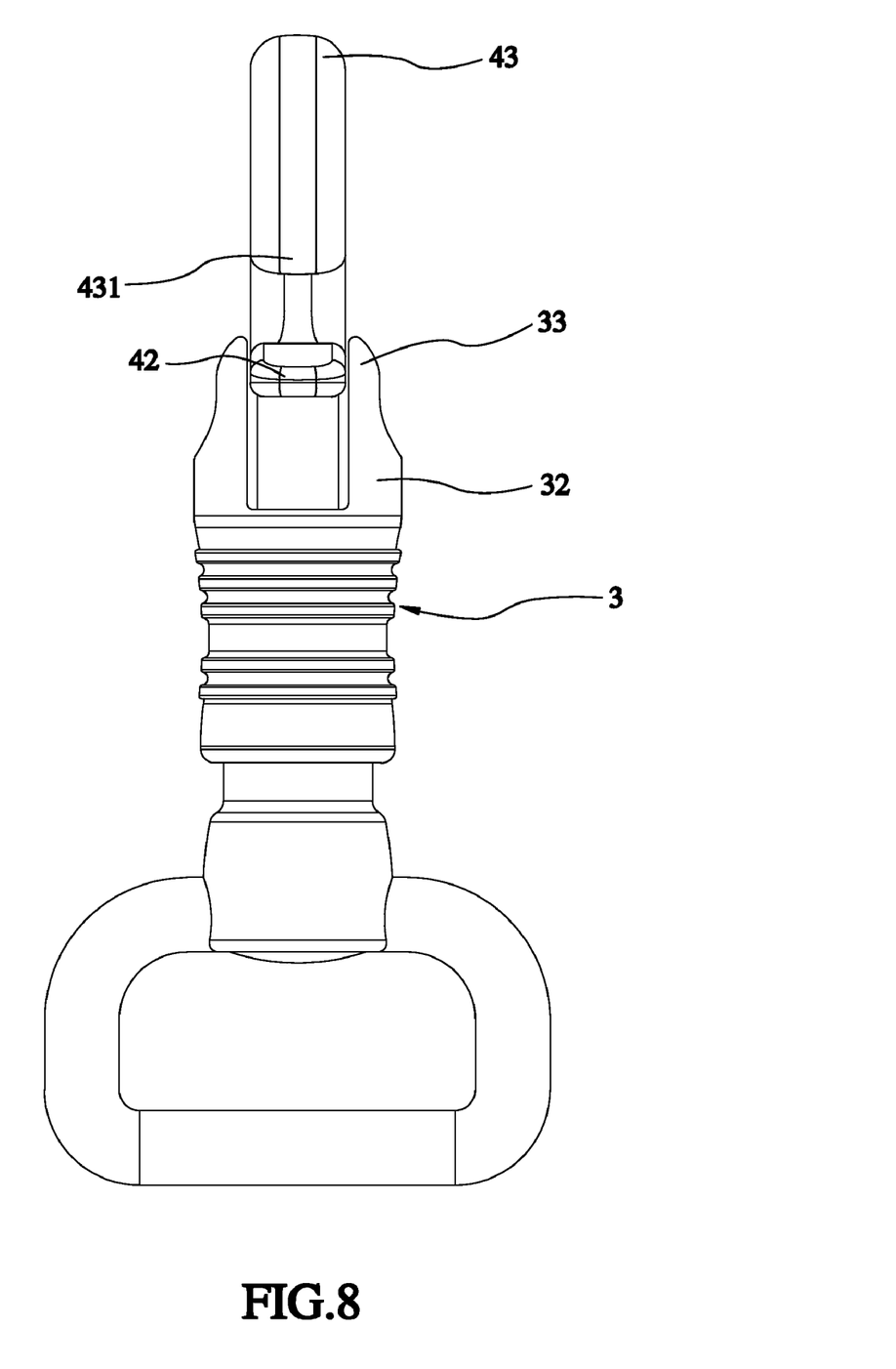
FIG. 8 is a side view of FIG. 7.
Figure 9:
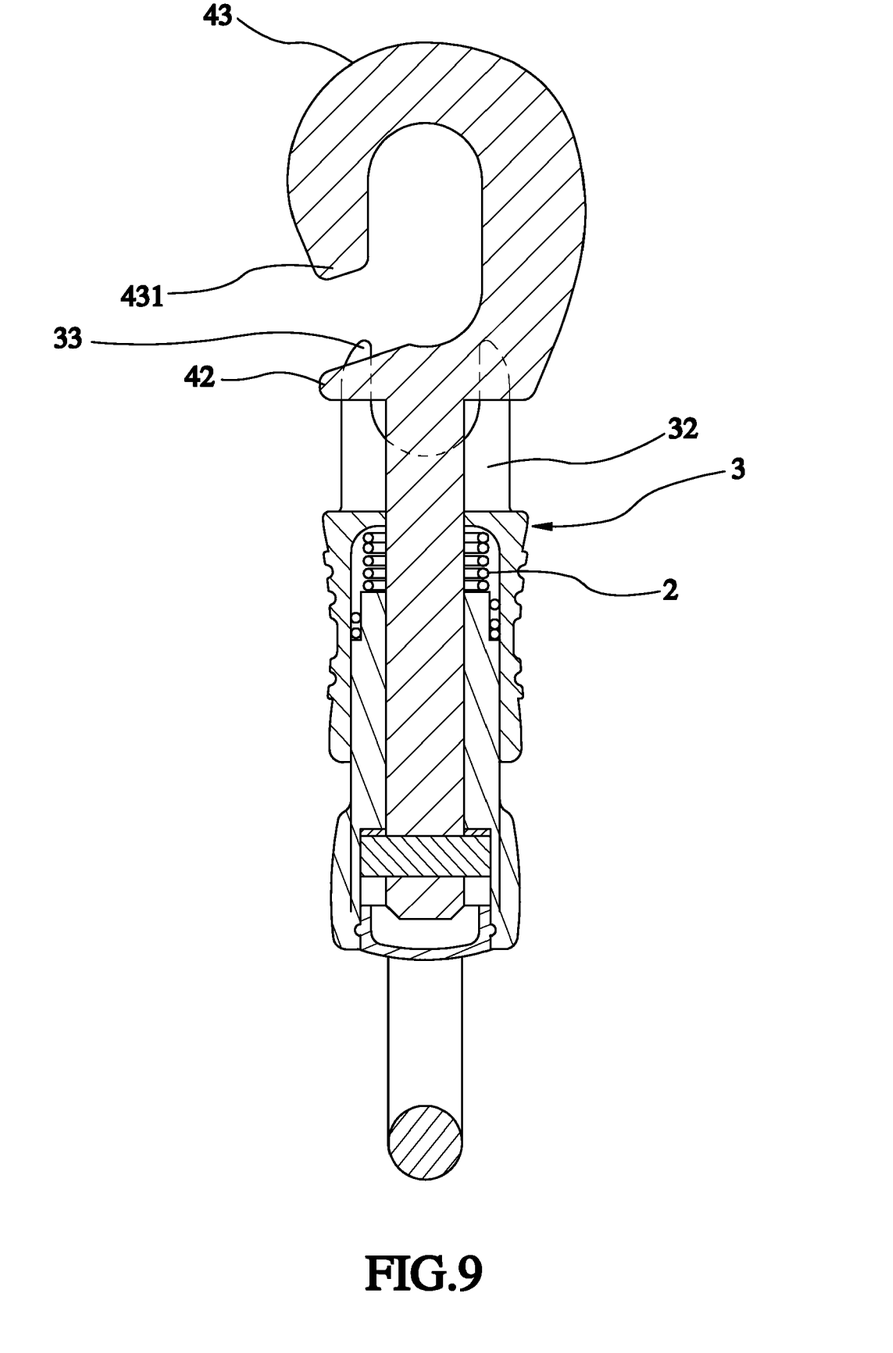
FIG. 9 is a sectional view of FIG. 7.
Figure 10:
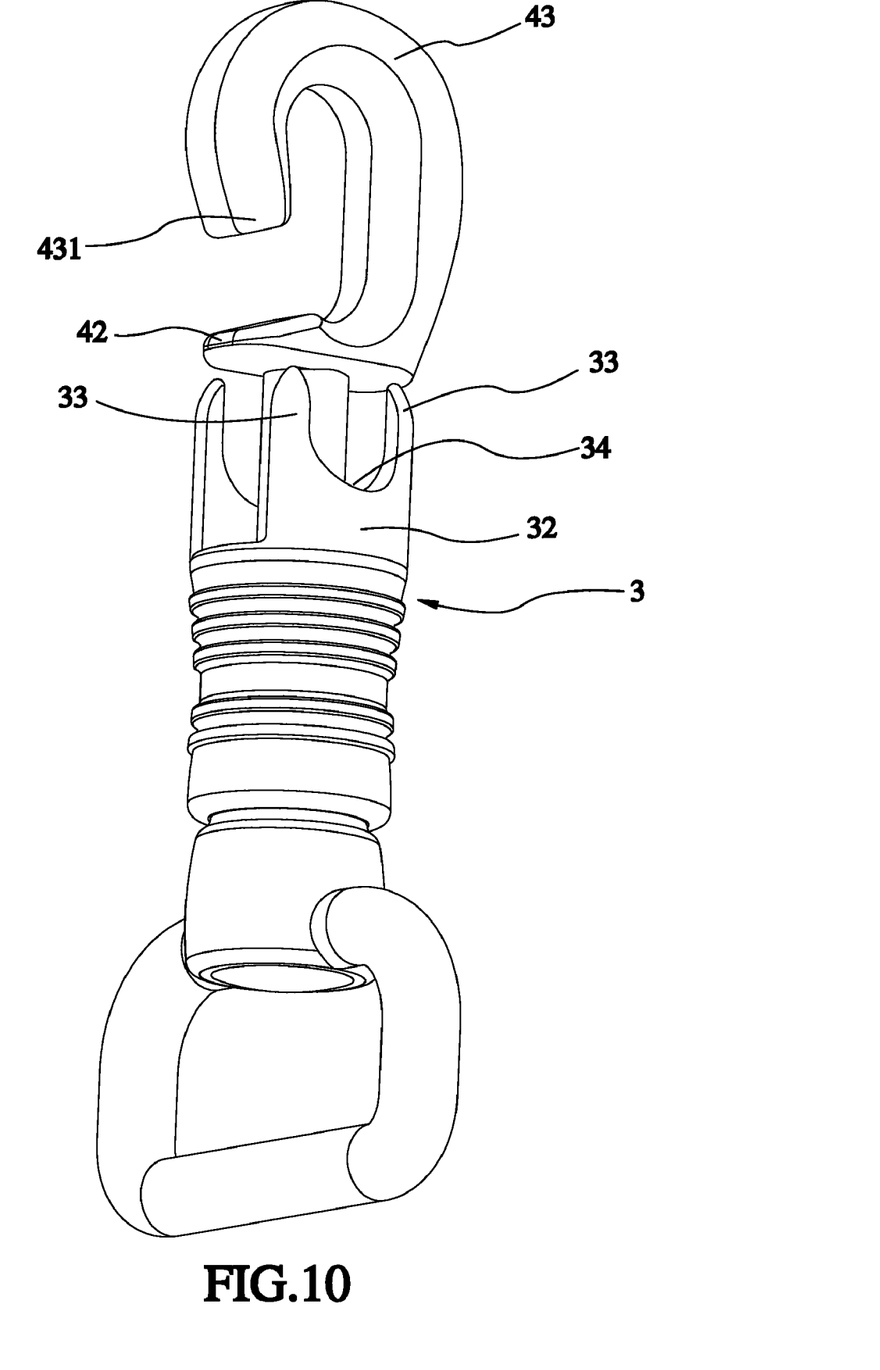
FIG. 10 is a perspective view of FIG. 7.

Referring to FIGS. 1 to 3, a swivel hook assembly in accordance with a first embodiment of the present invention is shown comprising a hook holder 1, a spring member 2, a barrel 3, a hook 4, a friction bearing plate 5, a pin 6, and a cap 7.

The hook holder 1 has a base 11 and a ring 12. The base 11 has an axle hole 13 axially extending through top and bottom sides thereof, and an accommodation chamber 14 formed in the bottom side in communication with the axle hole 13. The friction bearing plate 5 is an annular plate member mounted in the accommodation chamber 14. The ring 12 is shaped like an endless loop connected to one end, namely, the bottom end of the base 11.

The spring member 2 has its one end connected to the other end, namely, the top end of the base 11 of the hook holder 1.

The barrel 3 is stopped against the other end of the spring member 2 and sleeved onto the outer diameter of the base 11 of the hook holder 1, and axially movable relative to the hook holder 1 between a first position and a second position. The barrel 3 has an inside stop flange 31 radially inwardly extended from its one end, namely, the top end, and stopped against the other end of the spring member 2, which imparts an outward pressure to the barrel 3 in direction away from the hook holder 1 to hold the barrel 3 in the first position, and two locating plates 32 bilaterally axially extending from the top end. Each locating plate 32 has two teeth 33 and a locating groove 34 defined between the two teeth 33.

The hook 4 has a hook shank 41, a hook head 43 and a neck 42 connected between the hook shank 41 and the hook head 43. The shank 41 is inserted through the barrel 3, the axle hole 13 of the hook holder 1 and the friction bearing plate 5, having an insertion hole 411 transversely extending through the periphery near the bottom end thereof and suspending in the accommodation chamber 14 of the base 11.

The pin 6 is fitted into the insertion hole 411 of the shank 41 of the hook 4 and stopped at one side of the friction bearing plate 5 in the accommodation chamber 14 of the base 11 to prohibit disconnection of the hook 4 from the hook holder 1, allowing rotation of the hook 4 relative to the hook holder 1.

The cap 7 is fastened to the bottom side of the base 11 to close the accommodation chamber 14, prohibiting the shank 41 from extending out of the accommodation chamber 14 and assuring movement of the insertion hole 411 with the shank 41 within the accommodation chamber 14.

Further, the hook head 43 is disposed between the two locating plates 32 of the barrel 3, having an end portion 431. When the barrel 3 is in the first position, the end portion 431 of the hook head 43 is stopped between the teeth 33 of the two locating plates 32 and kept in a closed condition. On the contrary, when the barrel 3 is in the second position, the end portion 431 of the hook head 43 is kept away from the teeth 33 of the locating plates 32 in an open condition for hooking.

For hooking on an object (for example, a rope) steadily, the swivel hook assembly of the present invention has the following features:

1. When the barrel 3 is in the first position, the topmost edges of the teeth 33 of the locating plates 32 are kept at an elevation 0.5 cm above the bottom side of the end portion 431 of the hook head 43 so that the end portion 431 of the hook head 43 is stopped between the teeth 33 of the two locating plates 32 and kept in the closed condition.

2. When the barrel 3 is in the first position, the bottom side of each locating groove 34 is kept at an elevation not higher than the bottom side of the hook head 43 so that the hooked object will only touch the bottom side of the hook head 43 and the barrel 3 will not be forced downwards to separate the locating plates 32 from the end portion 431 of the hook head 43 when the hooked object is forced downwards.

3. When the barrel 3 is in the second position, the bottom side of each locating groove 34 is kept at an elevation above the bottom side of the neck 42 so that the hook head 43 is constantly kept between the two locating plates 32, avoiding escape of the hook head 43 from the space between the two locating plates 32.

After understanding of the structural details of the swivel hook assembly of the first embodiment of the present invention, the operation and effects of the swivel hook assembly are outlined hereinafter.

Referring to FIGS. 3-6, after the swivel hook assembly hooked on an object (for example, a rope), the spring member 2 supports the barrel 3 in the first position, and the end portion 431 of the hook head 43 is stopped between the teeth 33 of the two locating plates 32 and kept in the closed condition, and therefore the object is prohibited from escaping out of the constraint of the swivel hook assembly. When in the closed position, the end portion 431 of the hook head 43 is stopped between the teeth 33 of the two locating plates 32 against external twisting force, preventing accidental disconnection of the hook head 43 from the hooked object. The arrangement in which the end portion 431 of the hook head 43 is kept between the teeth 33 of the two locating plates 32 at an elevation not higher than the bottom side of the locating groove 34 of each locating plate 32 avoids accidental triggering of the swivel hook assembly to disengage the hook head 43 from the hooked object.

Referring to FIGS. 7-10, when a user presses the barrel 3 relative to the hook holder 1 to move the barrel 3 to the second position, the teeth 33 of the locating plates 32 are moved away from the end portion 431 of the hook head 43, allowing removal of the object from the swivel hook assembly. When the user releases the hand from the barrel 3 after removal of the hook head 43 from the object, the spring member 2 forces the barrel 3 backwards from the second position to the first position to close the hook head 43 again.

Subject to the aforesaid operation process, the invention has the following effects:

1. When the hook head 43 is in the closed condition, the end portion 431 of the hook head 43 is kept between the teeth 33 of the two locating plates 32 against external force, therefore the swivel hook assembly has a high strength against stretching, avoiding disconnection of the hook head 43 from the object on which it hooked.

2. When the hook head 43 is in the closed condition, the end portion 431 of the hook head 43 is kept between the teeth 33 of the two locating plates 32 but not stopped against the teeth 33 of the two locating plates 32 in an end-to-end manner. Therefore, biasing between the locating plates 32 and the hook head 43 does not cause the hook head 43 to be opened, assuring connection stability.

3. The arrangement in which the hook head 43 is kept between the teeth 33 of the two locating plates 32 avoids accidental triggering of the swivel hook assembly to disconnect the hook head 43 from the object.

Figure 11:
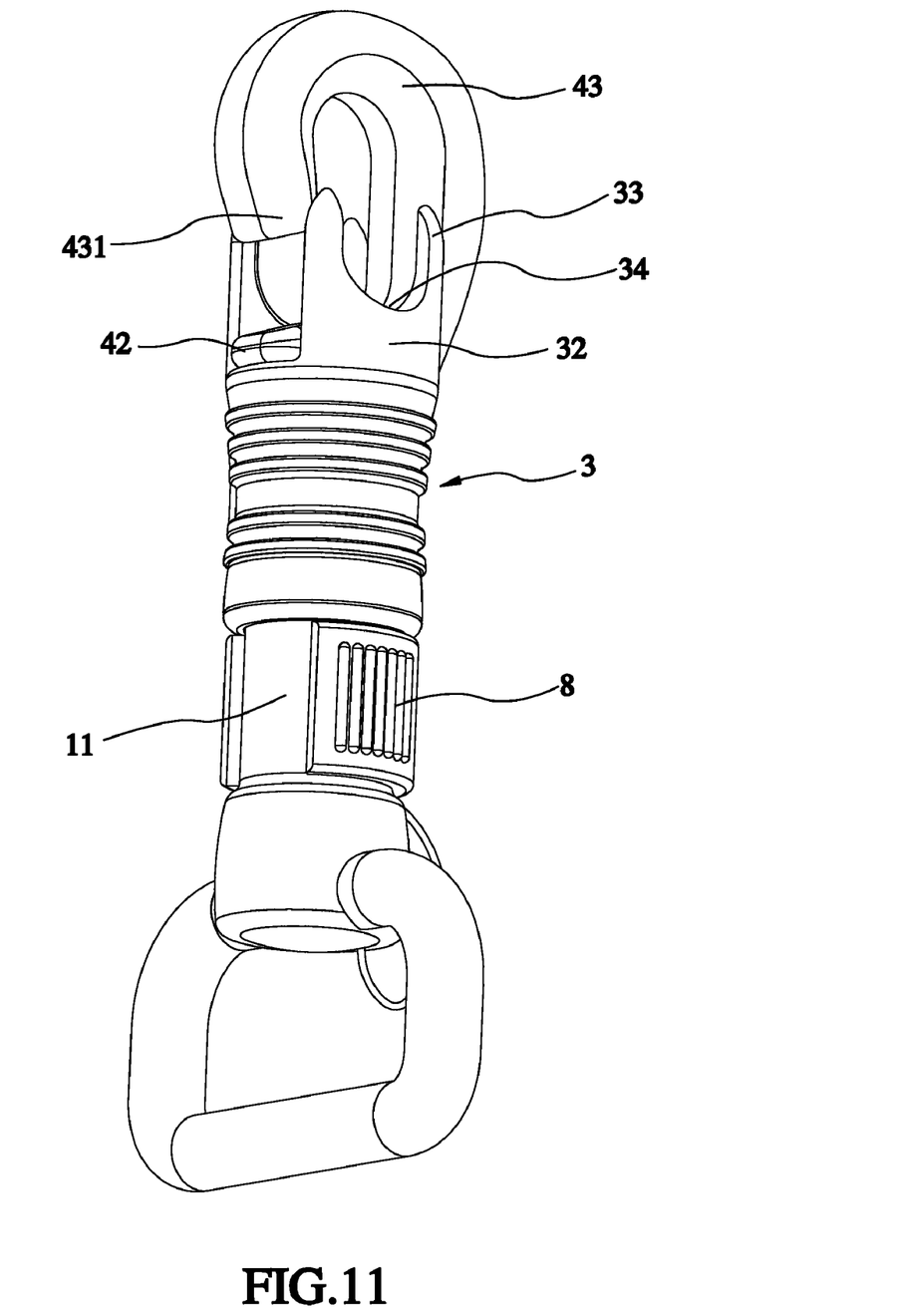
FIG. 11 is a perspective view of a swivel hook assembly in accordance with a second embodiment of the present invention.
Figure 12:
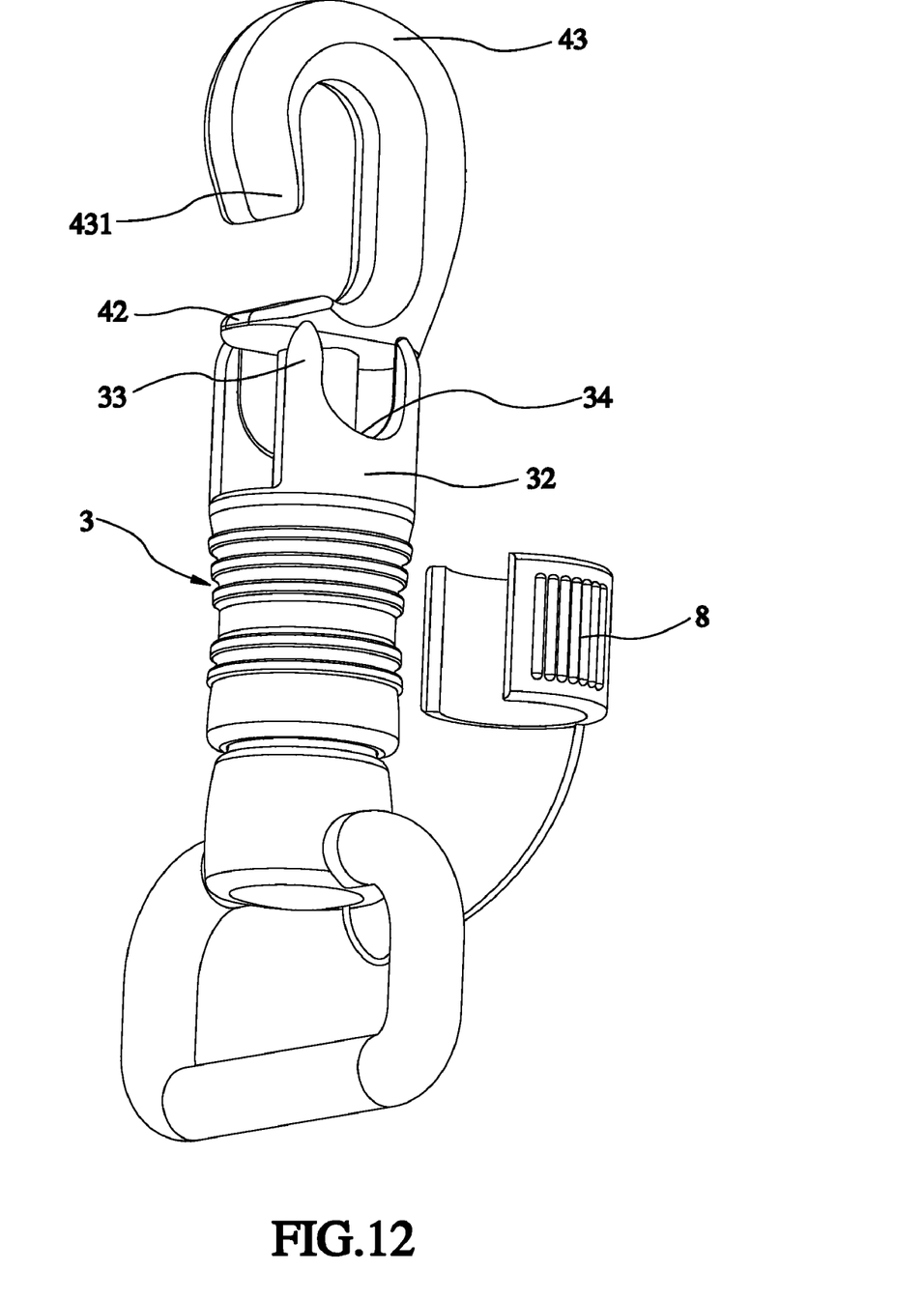
FIG. 12 is similar to FIG. 11, but showing that the stop member is removed from the base of the hook holder and the hook head is opened.

FIGS. 11-12 show a swivel hook assembly in accordance with a second embodiment of the present invention. This second embodiment is substantially similar to the aforesaid first embodiment with the exception that this second embodiment further comprises a stop member 8 connected to the cap 7 by a cord member. The stop member 8 is an elastic split barrel detachably attachable to the periphery of the base 11 of the hook holder 1 and settable between a lower part of the base 11 of the hook holder 1 and the bottom side of the barrel 3 to stop the barrel 3 in the first position.

By means of attaching the stop member 8 to the periphery of the base 11 of the hook holder 1 to have the stop member 8 be stopped between the lower part of the base 11 of the hook holder 1 and the bottom side of the barrel 3, the barrel 3 is locked in the first position. When wishing to remove the swivel hook assembly from the hooked object, remove the stop member 8 from the base 11 of the hook holder 1, and then press the barrel 3 to lower the barrel 3 from the first position to the second position for allowing disconnection of the hook head 43 from the object on which the hook head 43 hooks.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A swivel hook assembly, comprising:
   a hook holder having an axle hole;
   a spring member having a first end connected to said hook holder and a second end opposite to said first end;
   a barrel sleeved onto said hook holder and stopped against the second end of said spring member and movable relative to said hook holder between a first position and a second position, said barrel being held in said first position by said spring member;
   a hook having a hook shank passing through said barrel and inserted in said axle hole of said hook holder, and a hook head having an end portion; and
   a stop member attachable to said hook holder to lock said barrel in said first position,
   wherein said barrel comprises two locating plates axially extending from one end thereof and disposed at two opposite sides relative to said hook; the end portion of said hook head is kept between said two locating plates so that said hook head is closed when said barrel is kept in said first position; the end portion of said hook head is spaced from said two locating plates so that said hook head is opened when said barrel is kept in said second position; and said stop member an elastic split barrel.

2. The swivel hook assembly as claimed in claim 1, wherein said hook holder comprises a base and a closed ring connected to one end of said base.

3. The swivel hook assembly as claimed in claim 1, wherein said barrel comprises an inside stop flange stopped against the second end of said spring member.

4. The swivel hook assembly as claimed in claim 1, wherein each said locating plate of said barrel comprises at least one tooth and a locating groove.

5. The swivel hook assembly as claimed in claim 4, wherein each said locating plate of said barrel comprises two teeth and the locating groove of each said locating plate is defined between the two teeth.

6. The swivel hook assembly as claimed in claim 4, wherein said tooth has a topmost edge disposed above the elevation of a lowest edge of said end portion of said hook head when said barrel is kept in said first position.

7. The swivel hook assembly as claimed in claim 4, wherein the locating groove of each said locating plate has a lowest edge thereof disposed in flush with the elevation of a bottom side of said hook head when said barrel is kept in said first position.

8. The swivel hook assembly as claimed in claim 4, wherein the locating groove of each said locating plate has a lowest edge thereof disposed below the elevation of a bottom side of said hook head when said barrel is kept in said first position.

9. The swivel hook assembly as claimed in claim 4, wherein said hook comprises a neck connected between said hook head and said hook shank; the locating groove of each said locating plate has a lowest edge thereof disposed above the elevation of a bottom side of said neck of said hook when said barrel is kept in said second position.

10. A swivel hook assembly, comprising:
    a hook holder having an axle hole;
    a spring member having a first end connected to said hook holder and a second end opposite to said first end:
    a barrel sleeved onto said hook holder and stopped against the second end of said spring member and movable relative to said hook holder between a first position and a second position, said barrel being held in said first position by said spring member; and
    a hook having a hook shank passing through said barrel and inserted said axle hole of said hook holder, and a hook head having an end portion;
    wherein said barrel rises two locating plates axially extending from one end thereof and disposed at two opposite, sides relative to said hook; the end portion of said hook head is kept between said two locating plates so that said hook head is closed when said barrel is kept in said first position; the end portion of said hook head is spaced from said two locating plates so that said hook head is opened when said barrel is kept in said second position; and
    wherein said barrel has an accommodation chamber formed in one end thereof opposite to said spring member; said hook shank of said hook comprises an insertion hole transversely disposed at a bottom end thereof remote from said hook head and suspending in said accommodation chamber of said barrel, a pin fastened to said insertion hole, and a friction bearing plate coupled to said bottom end and stoppable between said pin and a bottom wall of said accommodation chamber to secure said hook shank to said barrel for allowing rotation of said hook in said axle hole.

11. The swivel hook assembly as claimed in claim 10, further comprising a cap fastened to said barrel to close said accommodation chamber.

12. The swivel hook assembly as claimed in claim 11, further comprising a stop member connected to said cap by a cord member and attachable to said hook holder to lock said barrel in said first position.

* * * * *